(12) United States Patent
Moody

(10) Patent No.: US 7,676,402 B2
(45) Date of Patent: Mar. 9, 2010

(54) CUSTOMIZED SECURITY TINT SYSTEM AND METHOD

(75) Inventor: Jay T. Moody, Wayland, MA (US)

(73) Assignee: Vistaprint Technologies Limited, Hamilton (BM)

( * ) Notice: Subject to any disclaimer, the term of this patent is extended or adjusted under 35 U.S.C. 154(b) by 268 days.

(21) Appl. No.: 11/481,206

(22) Filed: Jul. 5, 2006

(65) Prior Publication Data

US 2008/0010075 A1    Jan. 10, 2008

(51) Int. Cl.
*G06Q 30/00* (2006.01)
(52) U.S. Cl. .................................................. 705/26
(58) Field of Classification Search .................. 705/1
See application file for complete search history.

(56) References Cited

U.S. PATENT DOCUMENTS 5,717,597 A * 2/1998 Kara ........................... 705/408
2002/0089174 A1 * 7/2002 Attia et al. .................. 283/116
2003/0004997 A1 * 1/2003 Parker et al. ................ 707/513
2003/0035136 A1 * 2/2003 Yamagishi et al. ......... 358/1.15

OTHER PUBLICATIONS

National Envelope and Williamhouse Are Pleased to Bring You This Comprehensive, Functionally Organized Envelope Guide, 2003, retrieved from http://sunriseprintinglimited.com/sunrise/wp-content/uploads/2009/01/envelopeinformation.pdf on Oct. 9, 2009.*
Journal of Forms Management, "The Flap Is About—11 Ways to Save Procurement Dollars Through Envelope Design," vol. 12, No. 4, Nov. 1987/Jan. 1988, pp. 16-18.*
www.wikipedia.org, "Google Logo," retrieved on Dec. 2, 2009.*

* cited by examiner

*Primary Examiner*—John W Hayes
*Assistant Examiner*—Nathan Erb
(74) *Attorney, Agent, or Firm*—Robert L. Dulaney; Jessica J. Costa

(57) ABSTRACT

A customized envelope security tint design is generated based on user-supplied information. When ordering envelopes online, a user is provided with the option of entering characters for use as a custom security tint. A preview image of a custom tint design is displayed to the user for review. The user can place an order for production of envelopes having the custom design printed as the envelope security tint.

10 Claims, 5 Drawing Sheets

CUSTOMIZED SECURITY TINT SYSTEM AND METHOD

FIELD OF THE INVENTION

This invention relates to the creation of customized electronic designs for products intended to be printed.

BACKGROUND OF THE INVENTION

Envelopes with a design or pattern printed on the inside are well known and in widespread use by individuals, professionals, organizations, and businesses. This inside printing, referred to herein as a "security tint" or simply "tint", increases the opaqueness of the envelope and provides the sender and the recipient with increased confidence that the contents of the envelope will not be read by any of the third parties who may have access to the envelope in the course of its delivery.

The printed security area on the inside of an envelope becomes visible to the recipient when the envelope is opened and presents an additional opportunity for the sender of the envelope to communicate and connect with the recipient, for example by using the security tint to convey a message of appreciation, instruction, greetings, inspiration or whatever the sender may deem appropriate. For individuals and small businesses, however, this opportunity is typically missed.

Individuals and very small businesses generally buy boxes of off-the-shelf envelopes with security tint and put their return address on the envelope using a rubber stamp or an adhesive return address label. Some organizations and small businesses purchase envelopes pre-printed by the envelope vendor with the return address of the business, and possibly its logo, but, when it comes to the envelope security tint, the typical small business customer is offered either no choice at all or allowed to choose among a limited selection of standard tints offered by the vendor. A security tint customized for a single customer has traditionally been a viable option only for relatively large businesses that have the budget to afford the extra expense charged by envelope vendor for the special design effort and extra set-up required and, because the envelope vendor may require that customers requesting a special security tint commit to purchase a significant quantity of the custom tinted envelopes, that have a substantial demand for envelopes. Customized security tints have, therefore, typically not been a viable option for individuals and most small businesses.

There is, therefore, a need for a system and method allowing virtually anyone who is in the market for envelopes to quickly and easily design and order envelopes having a personalized security tint.

SUMMARY

The present invention is directed at satisfying the need for automated systems and methods for generating, previewing and ordering custom envelope security tints.

In accordance with one embodiment of the invention, a text entry field is provided allowing the user to enter text for incorporation into the security tint. A display image illustrating the security tint using the entered text is generated for user review and an image file of the tint design is generated for printing on envelope stock.

It is an advantage of the invention that a user can quickly create, review, revise and order a personalized security tint for the user's envelopes.

These and other objects, features and advantages of the invention will be better understood with reference to the accompanying drawings, description and claims.

DETAILED DESCRIPTION

Figure 1:
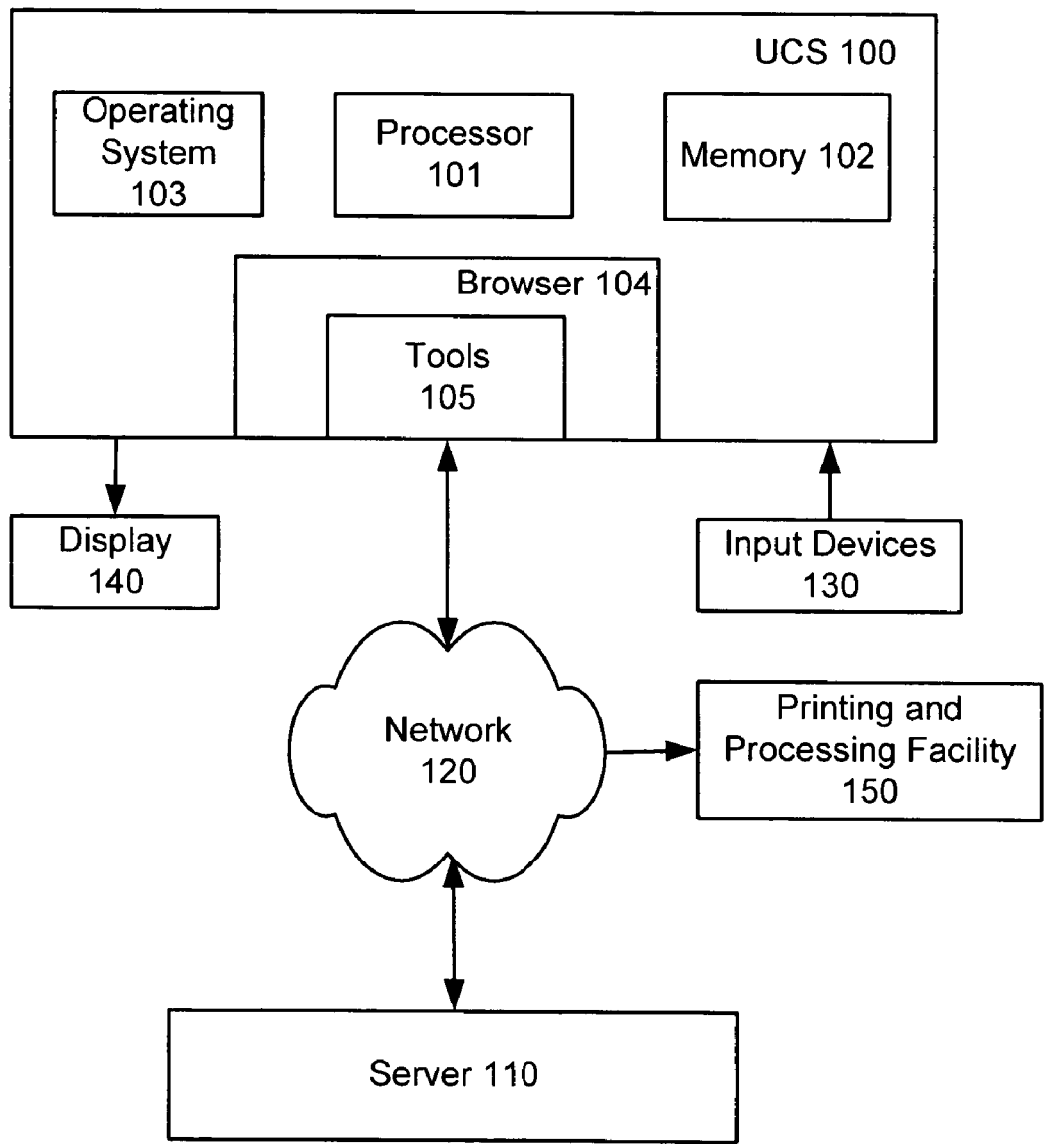
FIG. 1 shows an illustrative system with which the invention may be employed.

FIG. 1 depicts one illustrative system with which the invention may be employed. User computer system UCS 100 includes processor 101 and memory 102. Memory 102 represents all UCS 100 components and subsystems that provide data storage for UCS 100, such as RAM, ROM, and internal and external hard drives. In addition to providing permanent storage for all programs installed on UCS 100, memory 102 also provides temporary storage required by the operating system and any application program that may be executing. In the embodiment described herein, UCS 100 is a typically equipped personal computer, but UCS 100 could also be any other suitable device for interacting with server 110, such as a portable computer, a tablet computer, or a computer system particularly adapted or provided for electronic product design, such as a product design kiosk, workstation or terminal. The user views images from UCS 100 on display 140, such as a CRT or LCD screen, and provides inputs to UCS 100 via input devices 110, such as a keyboard and a mouse.

When UCS 100 is operating, an instance of the USC 100 operating system, for example a version of the Microsoft Windows operating system, will be running, represented in FIG. 1 by operating system 103. In FIG. 1, UCS 100 is running a Web browser 104, such as, for example, Internet Explorer from Microsoft Corporation. In the depicted embodiment, Tools 105 represents product design and ordering programs and tools downloaded to UCS 100 via Network 120 from remote Server 110, such as downloadable design and ordering tools provided by VistaPrint Limited and publicly available at VistaPrint.com. Tools 105 runs in browser 104 and exchanges information and instructions with Server 110 during a design session to support the user's preparation of a customized product. When the customer is satisfied with the design of the product, the design can be uploaded to Server 110 for storage and subsequent production of the desired quantity of the physical product on appropriate printing and post-print processing systems.

Printing services sites that allow a user to access the site from the user's home or work and design a personalized document are well known and widely used by many consumers, professionals, and businesses. Typically, these types of sites allow the user to review thumbnail images of a number of customizable designs prepared by the site operator with a variety of different styles, formats, backgrounds, color schemes, fonts and designs from which the user may choose.

When the user has selected a specific template design to customize, the sites typically provide online tools allowing the user to incorporate the user's personal information into the selected template to create a custom document design. Because the user is interacting with the service provider's site using a Web browser program running on the user's computer system, the document creation tools and displays are provided by the server to the user's computer in a language suitable for execution by the browser program. When the design is completed to the user's satisfaction, the user can place an order through the site for production and delivery of a desired quantity of the corresponding printed product.

While Server 110 is shown in FIG. 1 as a single block, it will be understood that Server 110 could be multiple servers configured to communicate and operate cooperatively to support Web site operations. Server 110 will typically be interacting with many user computer systems, such as UCS 100, simultaneously. Server 110 includes the components and subsystems that provide server data storage, such as RAM, ROM, and disk drives or arrays for retaining the various product layouts, designs, colors, fonts, and other information to enable the creation and rendering of electronic product designs.

When the product design is completed and the customer has placed an order for a desired quantity of the product, the order can transmitted to printing and processing facility 150 for production of the physical product. Facility 150 could be owned and operated by the operator of Server 110 or could be owned and operated by another party.

Figure 2:
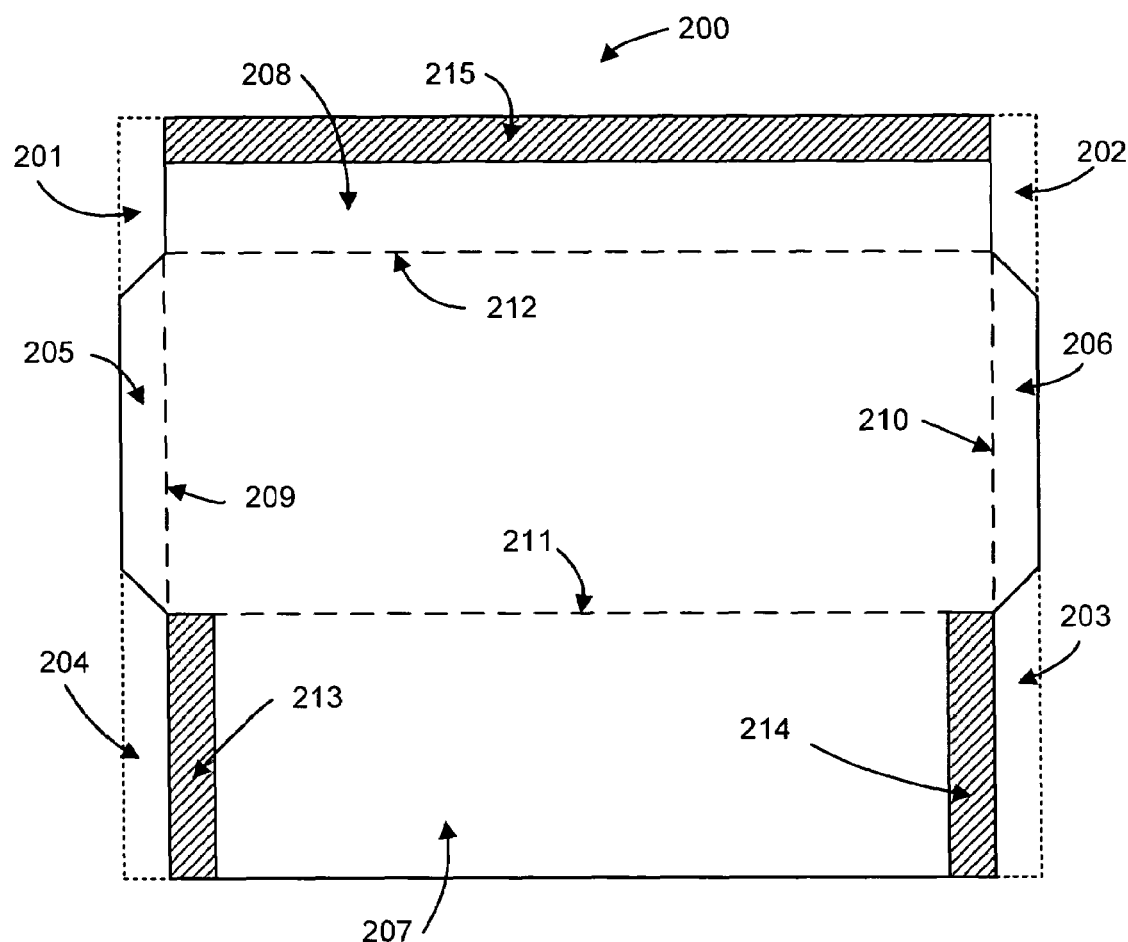
FIG. 2 shows the inside of an envelope prior to undergoing trimming, folding, and gluing.

FIG. 2 depicts rectangular sheet of paper 200 prior to being processed into a finished envelope by trimming, gluing and folding. After processing, the side of the sheet shown in FIG. 2 will become the "inside" of the envelope. It will be understood by those of ordinary skill in the art that envelopes can be of various sizes, shapes, and materials and can be trimmed and finished in various ways. The envelope depicted in FIG. 2 is merely representative for purposes of discussion illustrating the invention and the systems and methods disclosed herein are not limited to any particular size, shape, material or trimming details. Systems capable of performing envelope cutting, gluing and folding operations are commercially available from various vendors, such as Winkler+Dünnebier AG.

In processing sheet 200 into a finished envelope, the areas identified as 201-204 of sheet 200 are cut away and discarded. The removal of areas 201-204 leaves areas 205-208, which will be folded to form the back of the envelope. Areas 205 and 206 will be folded along the lines indicates by dashed lines 209 and 210 to form the side flaps, area 207 will be folded along the line indicated by dashed line 211 to form the bottom flap, and area 208 will be folded along the line indicated by dashed line 212 to form the seal flap of the envelope. During processing, an appropriate adhesive is applied to areas 213 and 214 to firmly attach back flap 207 to side flaps 205 and 206. An adhesive is also applied to area 215 to allow the user of the envelope to seal the envelope after the user's materials have been placed inside.

Figure 3:
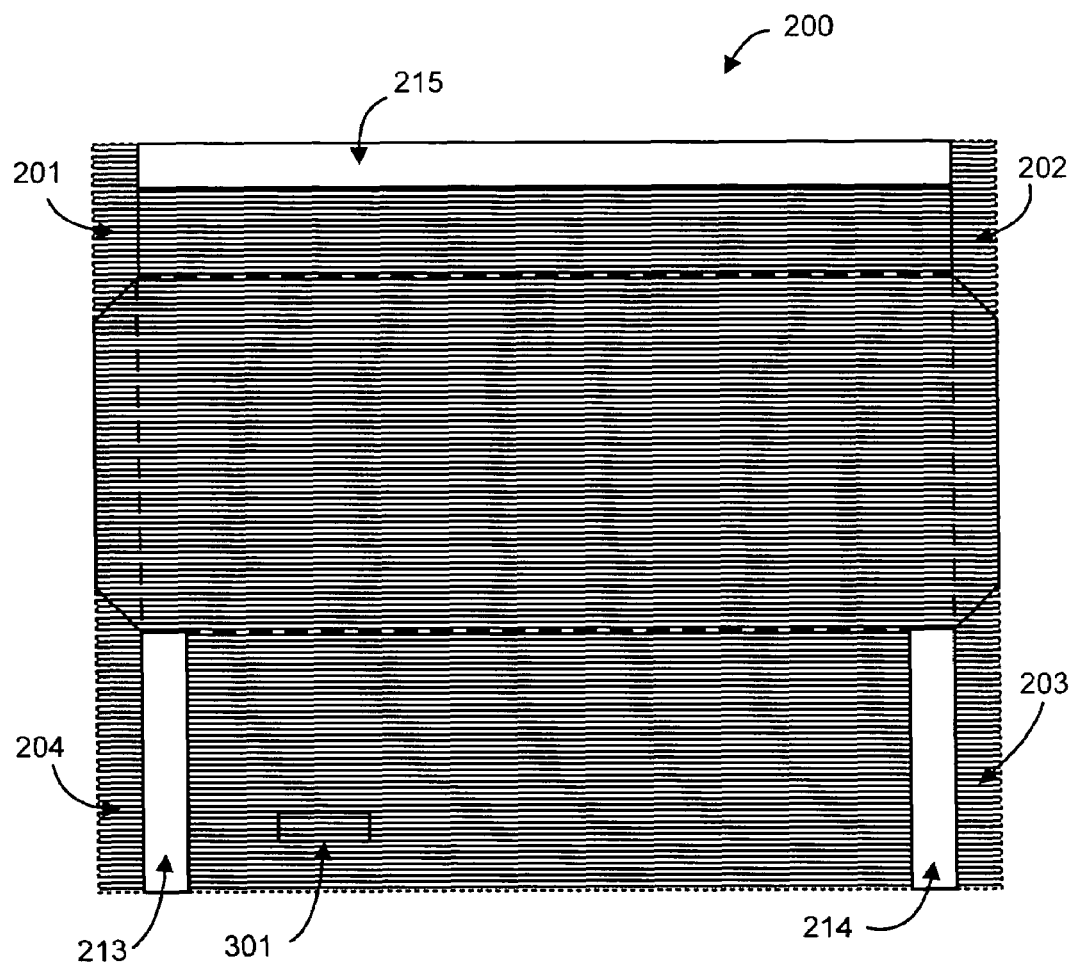
FIG. 3 shows the inside of an envelope with a security tint prior to undergoing trimming, folding and gluing.

FIG. 3 depicts sheet 200 after being printed with lines of text, indicated in FIG. 3 by alternating horizontal light and dark lines, that will act as a security tint in the folded envelope. In the embodiment discussed herein, the security tint text is printed in a relatively small font size, for example 8 point. The size and style of the printed text is an implementation detail and the provider of the online design tools could choose to offer larger or smaller print sizes in any of a variety of font styles. Areas 213-215 that will be receiving adhesives during subsequent processing have been left blank so that the adhesive is not applied to a printed surface. In the example shown in FIG. 3, areas 201-204 have been printed with the security tint, but, because these areas will be cut away, this is not essential.

Figure 4A:
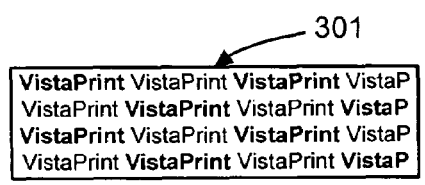
FIGS. 4A and 4B show an enlarged section of security tint printing.
Figure 4B:
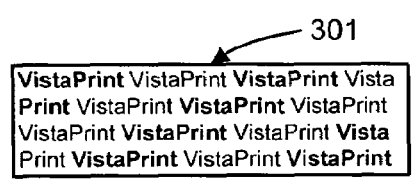

FIG. 4A is a magnified depiction of representative area 301 shown in FIG. 3. As mentioned above, besides its security function before the envelope is opened, the personalized tint will present a string of characters that is readily legible to the recipient of the envelope. It is, therefore, useful if adjacent text strings are displayed in a contrasting fashion to facilitate readability. Varying the appearance of the text such that the text above, below and to the sides appears differently increases the ability of the recipient of the envelope to distinguish and read the custom text. For illustration, area 301 shown in FIG. 4A repeats the text alternately in bolded and unbolded letters both horizontally and vertically. It will be understood that a security tint printed on envelopes could be printed in other manners, such as by alternately printing the text in black letters and white letters on a gray background. Direct alignment of the text is not essential. FIG. 4B illustrates another possible security tint text implementation.

Figure 5:
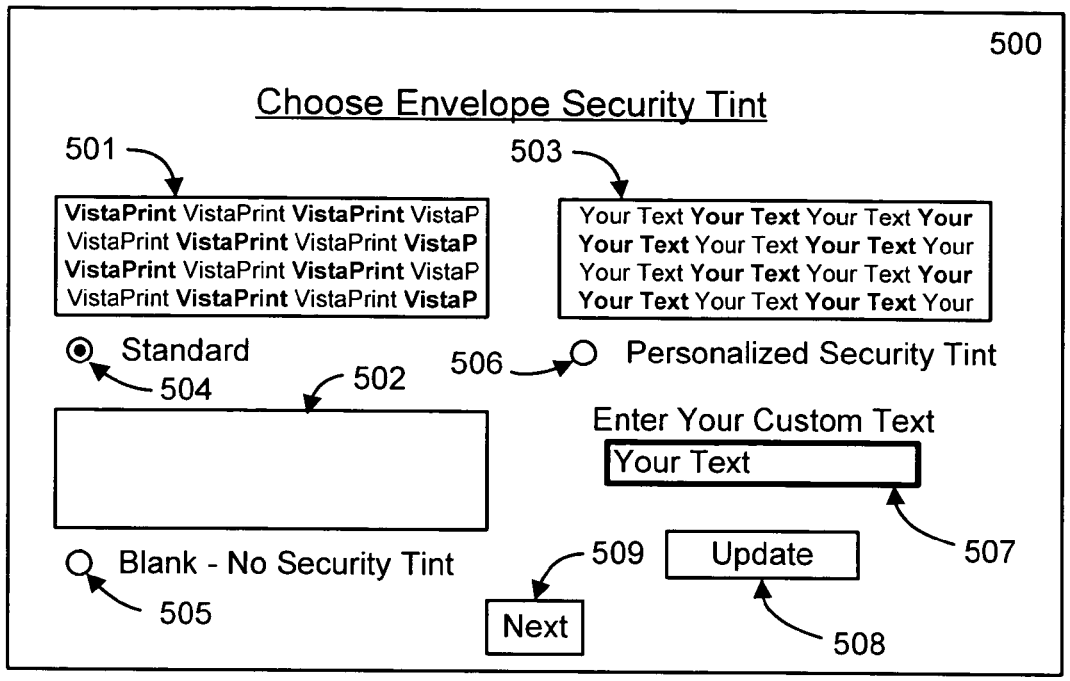
FIG. 5 shows a simplified representation of a display window for security tint selection.

As discussed above, Web-based sites allowing a user to electronically design and order a custom document in a desired quantity are well known in the art. In using these sites, the user typically is presented with a series of separate screen displays including screens (not shown) for selecting a desired product, selecting a product design, selecting fonts and other design features, adding user content to the product design, and making arrangements for ordering, printing, and delivery of the custom product in the desired quantity to the desired address. FIG. 5 depicts a simplified screen display 500 for use with an online envelope design and ordering system. Only those elements relevant to the illustration of the custom tint discussion are depicted in FIG. 5, but it will be understood that display 500 could also contain various other information notices, links, controls, and other content.

Figure 6:
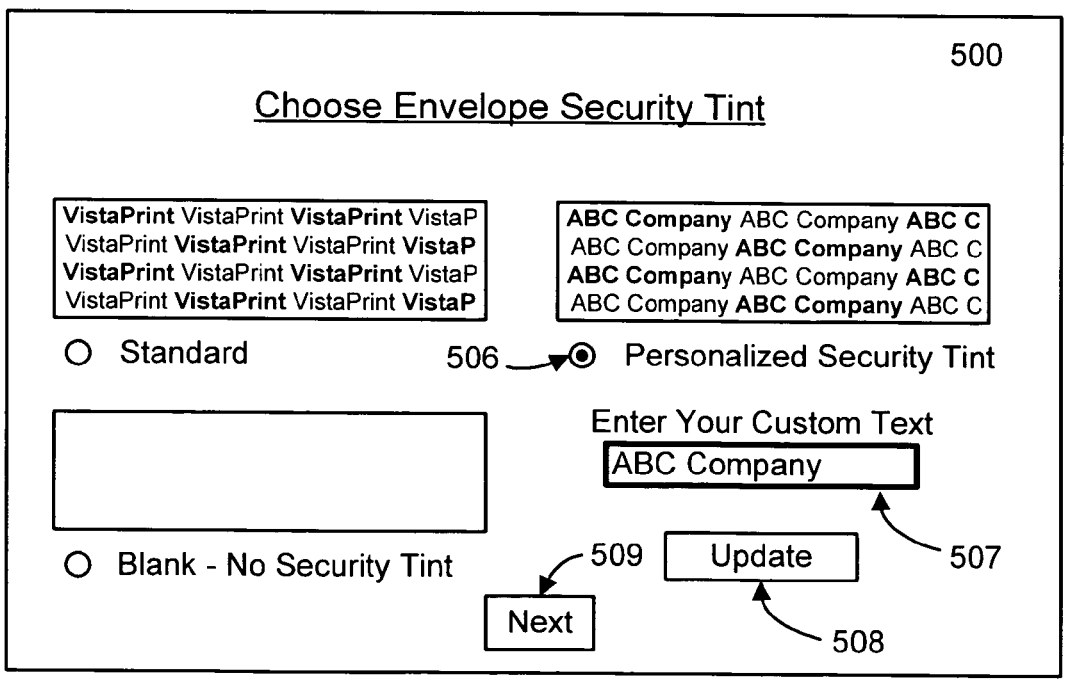
FIG. 6 shows another representation of the display window with custom text content.
Figure 7:
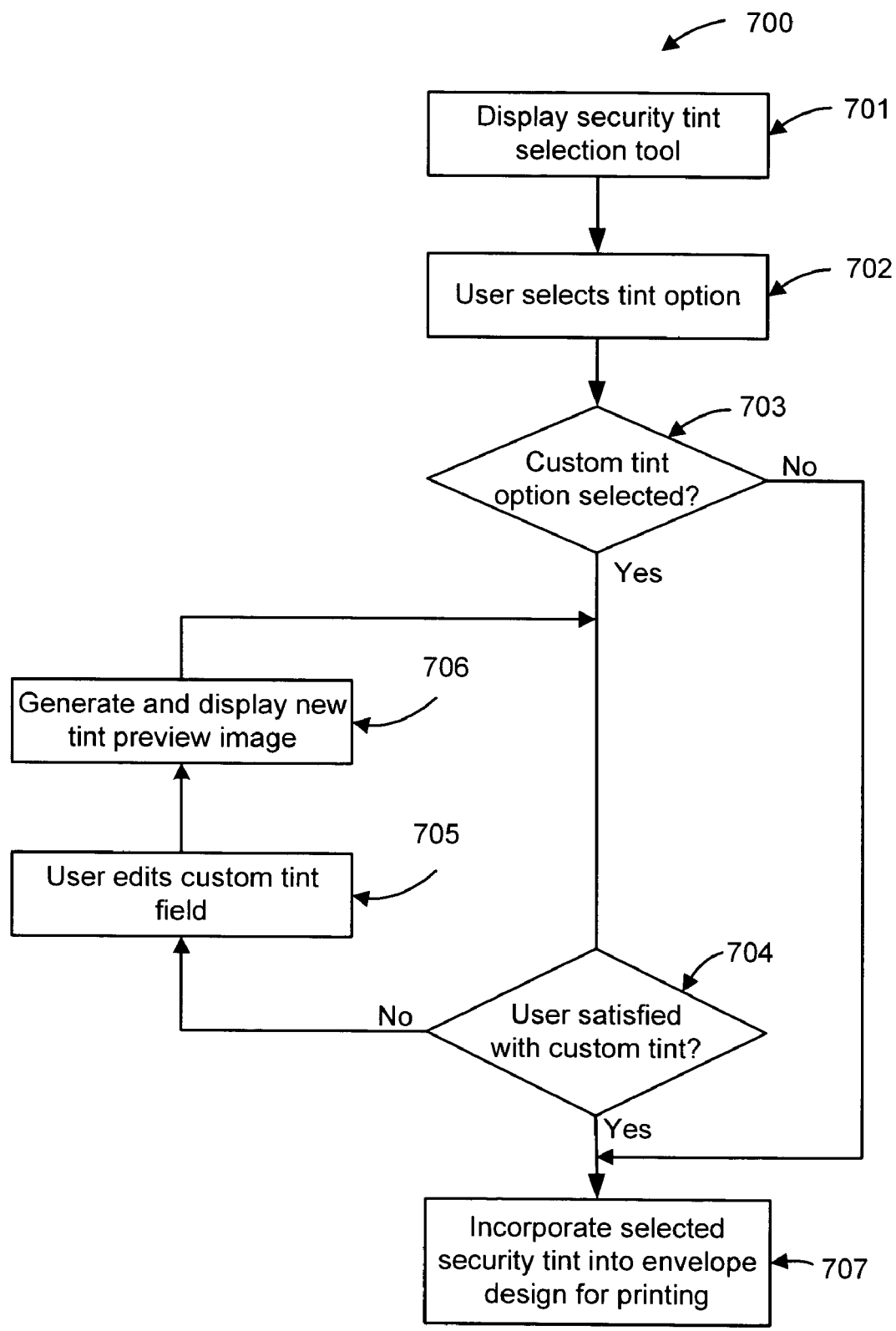
FIG. 7 is a flow diagram for one embodiment of a custom security tint envelope process.

Referring to FIGS. 5, 6 and 7, the operation of the custom security tint system will be discussed. FIG. 5 depicts screen 500 as initially displayed to a user engaged in ordering customized envelopes. In this example, the user is presented with three security tint options: standard, blank, and personalized. Blocks 501-503 each display a visual representation of the three tint choices and each has an associated radio button 504-506 allowing the user to select the desired tint option. Drop down menus or other selection techniques could alternatively be employed. In the example shown, the button associated with the "standard" option (which uses text selected by the envelope vendor) is pre-selected. Pre-selection is not required. Associated with display area 503 and button 506, is custom text entry field 507 allowing the user to enter the user's text for use as the security tint. To assist the user in comprehending the function and operation of the custom text field, the field is pre-filled with the words "Your Text". Corresponding to the pre-filled custom text field 507, display area 503 shows a portion of a security tint filled with "Your Text".

The user can select the custom text field 507, for example, by using the mouse, and replace "Your Text" with whatever characters the user desires. The text field entry is not limited to letters, but can include numbers, symbols and other characters. The envelope vendor can determine the maximum number of characters that the user will be allowed to enter in field 507. In the disclosed embodiment, a maximum of 50 characters are allowed, but longer or shorter field lengths could be employed. In the embodiment disclosed in FIG. 5, the user is constrained to only vary the text incorporated into the tint and not other elements of the tint, such as the tint color or the text size or font style. It will be understood that additional security tint controls could be incorporated into display 500, if desired by the envelope vendor, such as a tool offering the user a choice of font sizes or font styles for the custom text or a tool offering a choice of tint colors.

When the user has finished entering or editing the desired text in field 507, the user can select Update button 508, which will cause the contents of display area 503 to be updated with the text from field 507. FIG. 6 illustrates an example of display 500 after the user has selected button 506, entered the custom text "ABC Company" into custom text field 507, and clicked Update 508. Field 503 has been updated to reflect the text in field 507. In the embodiment discussed herein, when the user selects Update 508, the contents of the text field are transmitted to server 110, where a new image for display area 503 is generated and returned to UCS 100 for displaying to the user. It will be understood that alternatively, Tools 105 could be adapted to generate the updated contents for area 503 at UCS 100. When the user is satisfied with the security tint choice, the user can continue on the next screen in the envelope design and ordering process by clicking Next button 509.

As an alternate embodiment, screen 500 could be automatically personalized prior to initial display to the user. For example, instead of displaying the generic example of "Your Text" when screen 500 is displayed to the user, the system could have automatically pre-filled field 507 with a text string already available to the system and generated a corresponding preview image 503. A user ordering custom envelopes will typically have provided the envelope manufacturer with return address information for printing on the envelope. In this case, the first line of text provided as the return address information, generally the user's personal or business name, could be automatically entered by the system into field 507 and depicted in the preview image shown in block 503. The user can modify the contents of field 507 if the user desires that the security tint use text other than the information pre-filled by the system. If the user is satisfied with the pre-filled security tint choice, the user can continue on to the next screen in the envelope design and ordering process by clicking Next button 509.

As another alternate automatic customization, the user may have previously chosen a specific font style that can be automatically used for the security tint. For example, the user may have chosen a specific font for use in printing the user's return address or the user may have chosen a specific font for use in other printed materials being simultaneously ordered with the envelopes, such as personalized holiday cards, invitations, announcements, or other items intended for use with the envelopes.

FIG. 7 depicts a flow chart for the custom tint method discussed above. The process is initiated at step 700 and security tint display 500 is displayed to the user at step 701. The displaying of the custom tint tool to the user can be incorporated into the envelope ordering process at any step in the process deemed appropriate by the operator of server 110. At step 702, the user selects a desired tint option, for example by selecting one of the available radio buttons, as shown in FIGS. 5 and 6. If the user selects either the standard or blank option, the user can then proceed directly to the next step in the envelope process by clicking Next 509. If the user selects the personalized security tint option at step 703 and the pre-filled custom security tint is satisfactory to the user at step 704, the user can also proceed directly to the step in the envelope process by clicking Next 509. If the user desires to modify the initial custom tint that was automatically generated by the system, the user can edit the text in custom text field 507 at step 705 and click Update at step 706 to generate a new tint image for review in block 503. The user can repetitively enter text into field 507, click Update 508 and review the resulting security tint image in area 503 until the user is satisfied and moves to the next step in the envelope ordering process by clicking Next 509.

When the user has completed the envelope ordering process, the user's chosen custom text from field 507 is saved at Server 110 along with the other information supplied by the user in connection with the user's envelope order until the envelope design is prepared for printing. In preparation for printing, a high resolution print file for the security tint is prepared, for example, a file in PDF format, having the user's customer text repeated in horizontally and vertically in alternating styles, as discussed above. To create the desired number of envelopes, a corresponding number of sheets 200 are printed on a high resolution printing system, for example, a digital or an offset press, and then processed as discussed above to create finished envelopes.

While an exemplary embodiment of the invention has been discussed, the described embodiment is to be considered as illustrative rather than restrictive. The scope of the invention is as indicated in the following claims and all equivalent methods and systems.

What is claimed is:

1. A method for generating a custom envelope security tint for printing on envelope stock, the method comprising:
   providing a security tint text entry field to a user engaged in ordering customized security tinted envelopes from a remote envelope vendor different than the user,
   receiving a text entry from the security tint text entry field, the text entry comprising at least one character, and
   automatically generating, by a computer system, a printable electronic security tint design comprising repeated instances of the text entry filling a security tint area for an inside face of a sheet of the envelope stock,
   wherein the repeated instances of the text entry in the printable electronic security tint design are automatically rendered such that adjacent instances of the text entry appear visually distinguishable.

2. The method of claim 1 wherein the security tint text entry field is automatically pre-filled with text previously supplied by the user.

3. The method of claim 2 wherein the text previously supplied by the user is a company name.

4. The method of claim 2 wherein the text previously supplied by the user is the user's name.

5. The method of claim 1 wherein the custom envelope security tint is automatically rendered in a font style previously chosen by the user.

6. The method of claim 1 further comprising printing at least the security tint design image on the envelope stock and processing the printed envelope stock to create the customized security tinted envelopes.

7. The method of claim 1 wherein the adjacent instances of the text entry are automatically rendered in alternating appearances both horizontally and vertically in the printable electronic security tint design.

8. The method of claim 1 further comprising repetitively receiving text entries, defining printable electronic security tint designs, and generating display images until the user indicates that the printable electronic security tint design is satisfactory.

9. A custom envelope security tint computer-implemented system comprising:
   means for allowing a user engaged in ordering customized security tinted envelopes from a remote envelope vendor different than the user to supply at least one or more characters for a text entry for use in generating a custom envelope security tint, means for automatically generating a printable security tint design comprising repeated instances of the text entry filling a security tint area for an inside face of a sheet of envelope stock, and means for allowing the user to request from the remote envelope vendor the production of one or more customized security tinted envelopes having the printable security tint design printed on the inside face of the sheet of the envelope stock from which the customized security tinted envelope is constructed, wherein the repeated instances of the text entry in the printable security tint design are automatically rendered such that adjacent instances of the text entry appear visually distinguishable.

10. A custom envelope security tint computer-implemented system comprising:

means for receiving at least one character for a text entry from a user engaged in ordering customized security tinted envelopes from a remote envelope vendor different than the user, means for automatically generating a printable security tint design containing repeated instances of the text entry filling a security tint area for an inside face of a sheet of envelope stock, means for automatically generating a display image illustrating the printable security tint design for user review as the printable security tint design will appear when printed on the inside face of the envelope stock, the inside face forming the inside of a customized security tinted envelope when the envelope stock is formed into the customized security tinted envelope, and means for sending a printable security tint design image file to the remote envelope vendor for production of one or more customized security tinted envelopes having the printable security tint design printed on the respective inside faces of the customized security tinted envelopes, wherein the repeated instances of the text entry in the printable security tint design are automatically rendered such that adjacent instances of the text entry appear visually distinguishable.

* * * * *